(12) United States Patent
Håkansson

(10) Patent No.: US 7,114,891 B2
(45) Date of Patent: Oct. 3, 2006

(54) THREAD FORMING TOOL WITH ANNULAR RIDGE

(75) Inventor: Björn Håkansson, Halmstad (SE)

(73) Assignee: Sandvik Intellectual Property AB, Sandviken (SE)

(*) Notice: Subject to any disclaimer, the term of this patent is extended or adjusted under 35 U.S.C. 154(b) by 0 days.

(21) Appl. No.: 10/478,436

(22) PCT Filed: May 22, 2002

(86) PCT No.: PCT/SE02/00979

§ 371 (c)(1),
(2), (4) Date: May 12, 2004

(87) PCT Pub. No.: WO02/094491

PCT Pub. Date: Nov. 28, 2002

(65) Prior Publication Data

US 2004/0179914 A1    Sep. 16, 2004

(30) Foreign Application Priority Data

May 22, 2001    (SE) .................................... 0101813

(51) Int. Cl.
*B23G 7/02*    (2006.01)

(52) U.S. Cl. ................ 408/222; 407/29; 409/66; 409/74; 470/198

(58) Field of Classification Search ............... 408/57, 408/215, 216, 217, 218, 222; 407/29, 53, 407/56–63; 409/65, 66, 74; 470/198, 204
See application file for complete search history.

(56) References Cited

U.S. PATENT DOCUMENTS

| | | | |
|---|---|---|---|
| 150,346 A | * | 4/1874 | Morgan ...................... 408/222 |
| 700,892 A | * | 5/1902 | Blackburn et al. .......... 408/222 |
| 1,190,707 A | * | 7/1916 | Beindorf ..................... 408/216 |
| 1,195,717 A | * | 8/1916 | Pejauo ........................ 408/222 |
| 1,365,338 A | * | 1/1921 | Muth .......................... 408/222 |
| 2,523,450 A | * | 9/1950 | Rossetti ....................... 407/64 |
| 3,195,155 A | * | 7/1965 | Groh ........................... 470/18 |
| 3,458,882 A | * | 8/1969 | Kelly .......................... 470/198 |
| 3,802,015 A | | 4/1974 | Chase et al. |
| 3,875,780 A | | 4/1975 | Cochrum et al. |
| 4,171,177 A | * | 10/1979 | Barnsdale ................... 408/218 |
| 4,491,002 A | * | 1/1985 | Toropov et al. .............. 72/118 |
| 4,561,277 A | | 12/1985 | Taubert et al. |
| 4,599,021 A | * | 7/1986 | Kloster ....................... 408/221 |
| 4,761,844 A | * | 8/1988 | Turchan ...................... 470/199 |
| 4,943,191 A | * | 7/1990 | Schmitt ...................... 408/1 R |
| 5,678,962 A | | 10/1997 | Hyatt et al. |
| 5,733,078 A | * | 3/1998 | Matsushita et al. .......... 409/74 |
| 5,871,403 A | * | 2/1999 | Simmons et al. ............. 470/10 |
| 6,012,882 A | * | 1/2000 | Turchan ...................... 409/74 |
| 6,217,267 B1 | * | 4/2001 | Sugano et al. .............. 408/222 |

(Continued)

FOREIGN PATENT DOCUMENTS

DE    2414635 A    * 10/1975

(Continued)

*Primary Examiner*—Monica Carter
*Assistant Examiner*—Michael W. Talbot
(74) *Attorney, Agent, or Firm*—Drinker Biddle & Reath LLP

(57) ABSTRACT

A thread forming tool includes an elongated body defining a longitudinal center axis. The body including a thread forming portion formed by one or more annular ridges oriented perpendicular to the axis. The body has a non-circular shape in a cross sectional plane oriented perpendicular to the axis at an axial center of the ridge.

9 Claims, 2 Drawing Sheets

U.S. PATENT DOCUMENTS

Figure 1:
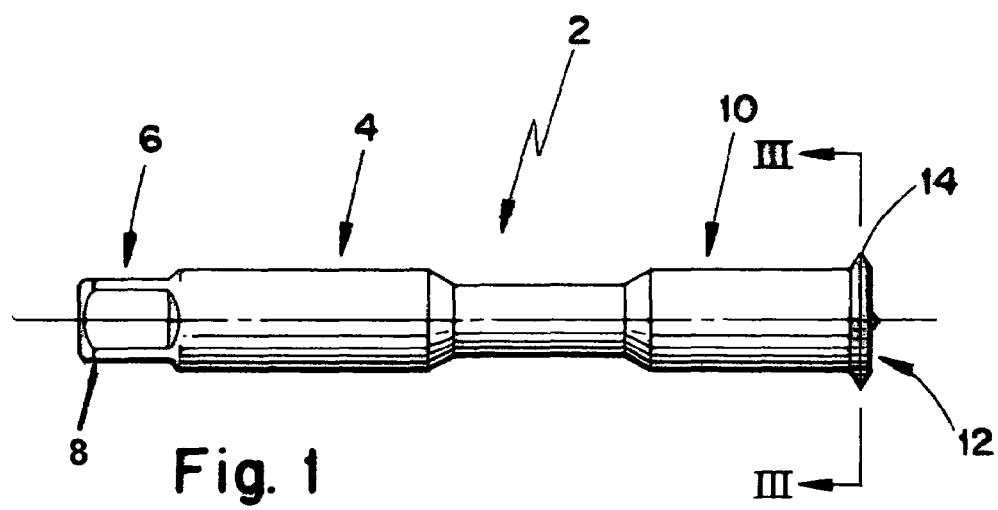

| | | | |
|---|---|---|---|
| 6,257,809 B1 * | 7/2001 | Silken | 408/129 |
| 6,257,810 B1 * | 7/2001 | Schmitt | 409/66 |
| 6,431,869 B1 * | 8/2002 | Reams et al. | 433/174 |
| 6,514,148 B1 * | 2/2003 | Glimpel et al. | 470/204 |
| 6,565,297 B1 * | 5/2003 | Schmitt | 409/66 |
| 6,663,326 B1 * | 12/2003 | Hiroyasu et al. | 408/144 |
| 6,685,573 B1 * | 2/2004 | Hikosaka et al. | 470/204 |
| 6,688,988 B1 * | 2/2004 | McClure | 470/198 |
| 2003/0108396 A1 * | 6/2003 | Schwarz | 408/222 |
| 2004/0170482 A1 * | 9/2004 | Henderer et al. | 408/222 |
| 2004/0258492 A1 * | 12/2004 | Hakansson | 408/222 |

FOREIGN PATENT DOCUMENTS

| | | | |
|---|---|---|---|
| DE | 39 34 621 | | 4/1991 |
| DE | 40 03 257 | | 8/1991 |
| DE | 10002756 A1 | * | 7/2001 |
| DE | 10318199 A1 | * | 11/2004 |
| FR | 2495511 A | * | 6/1982 |
| GB | 1484016 A | * | 8/1977 |
| GB | 2324752 A | * | 11/1998 |
| GB | 2404604 A | * | 2/2005 |
| JP | 2000343330 A | * | 12/2000 |
| JP | 2002370126 A | * | 12/2002 |
| SU | 1371811 A | * | 2/1988 |

* cited by examiner

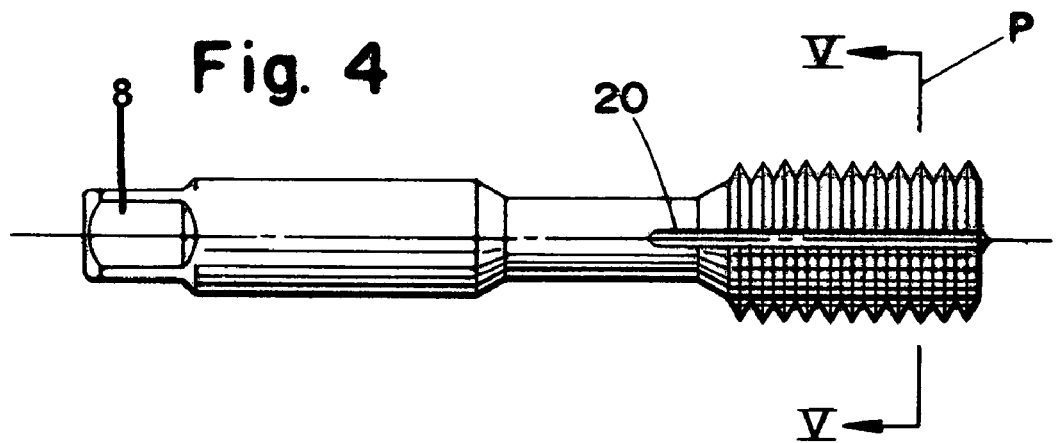
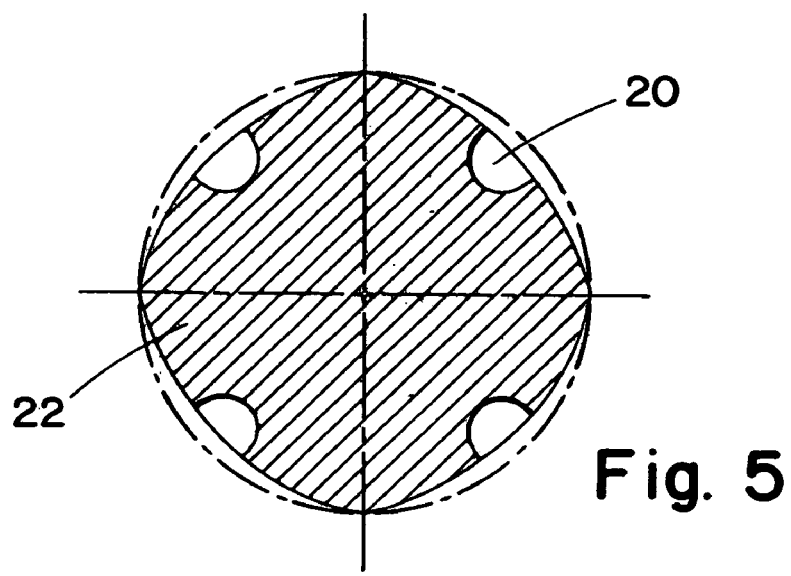

THREAD FORMING TOOL WITH ANNULAR RIDGE

TECHNICAL BACKGROUND OF THE INVENTION

The present invention relates to a thread forming tool comprising an elongated body, having at a first end a connector portion and at a second end a thread forming portion, said thread forming portion comprising at least one annular ridge about the circumference of said body.

It also relates to a method of forming a thread by means of such a thread forming tool.

TECHNICAL FIELD OF THE INVENTION

Such a thread forming tool is known from Hyatt et al. U.S. Pat. No. 5,678,962. It is however disadvantageous, since during milling, chips will be removed from the wall and will disturb the milling operation. Furthermore, the milling speed is relatively low.

SUMMARY OF THE INVENTION

The object of the present invention is to provide an improved thread forming tool.

This object has been achieved by the tool of the initially defined kind, wherein the cross-section of said body at an axial center of said ridge has a non-circular shape.

The object has also been achieved by the method of the initially defined kind, including introducing such a thread forming tool into an opening of a diameter larger than the diameter of said tool, while turning it about its own axis, and performing a circular movement about the circumference of said opening while moving said tool into the opening at a predetermined rate per turn about the circumference of said opening, hereby forming a thread of a predetermined pitch.

Since a relatively small part of the tool contacts the wall, causing less heat release, a longer working life and/or a faster thread forming operation is achieved compared to what is the case regarding the closest prior art tool.

Suitably said cross-section includes at least three lobes. Hereby, thread forming members are achieved.

Preferably, said annular ridge is perpendicular to the axial extension of the elongated body.

Suitably, said annular ridge is provided on at least one flank defining at least one flute for allowing supply of a cooling fluid, said flute dividing said ridge to a discontinuous ridge.

Advantageously, a plurality of parallel annular ridges are provided. Hereby efficient thread forming is achieved.

Preferably, the thread forming tool is made of solid carbide.

DRAWING SUMMARY

Figure 2:
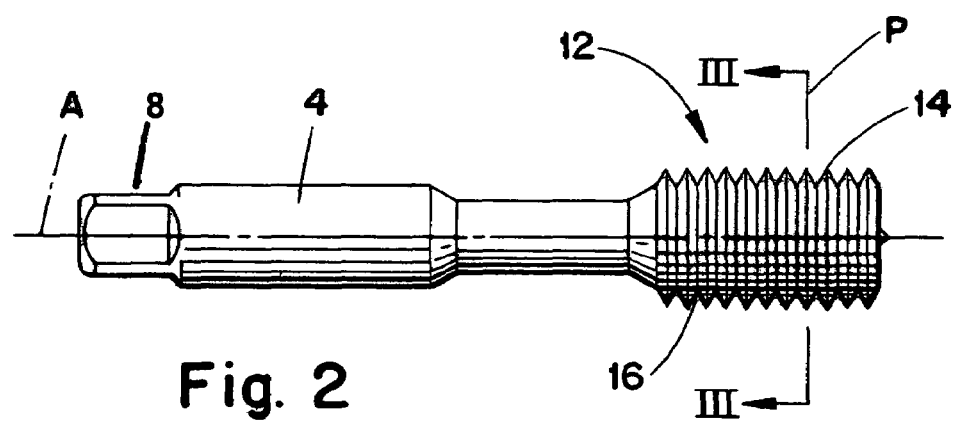
Figure 3:
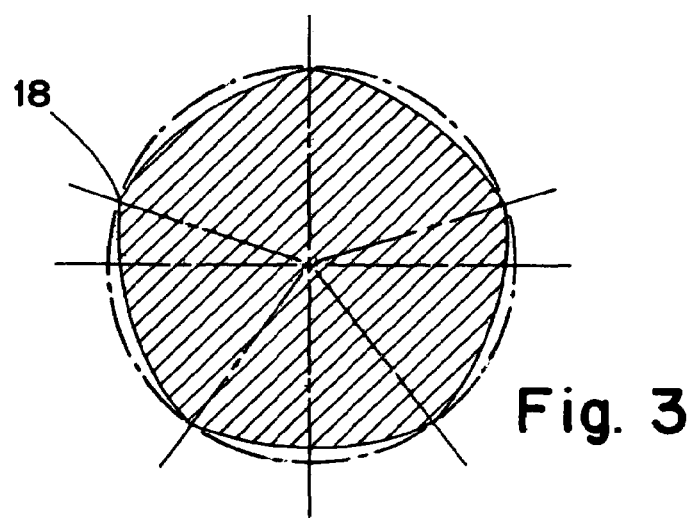

In the following, the invention will be described in more detail by reference to the accompanying drawings, in which FIG. 1 illustrates a thread forming tool provided with one annular ridge, FIG. 2 illustrates a thread forming tool provided with a plurality of ridges, FIG. 3 is a cross-section of the thread forming tool shown in FIG. 1 and FIG. 2 along the line III—III, respectively, FIG. 4 illustrates a thread forming tool provided with four flutes, and FIG. 5 is a cross-section along the line V—V of the thread forming tool shown in FIG. 4.

DETAILED DESCRIPTION

FIG. 1 shows a thread forming tool 2 having an elongated body 4. At a first end 6, a connector portion 8 is provided and at a second end 10, a thread forming portion 12 is provided. The tool 2 is preferably made of a high speed steel or a solid carbide material.

The connector portion 8 is adapted to be connected to a tool holder of a drilling, milling or tapping machine.

The thread forming portion 12 is provided with a single annular ridge 14.

In FIG. 2, the thread forming portion 12 is provided with a plurality of annular ridges 14, adjacent ridges defining therebetween an annular groove 16. The ridges are thus separated and do not form a helix.

In FIG. 3 is shown a cross-section of the ridge 14 shown in FIGS. 1 and 2, respectively. The ridge has a non-circular diameter. More particular, five lobes 18 are provided for plastically deforming the inner wall of an opening such that a helical thread is shaped. Thus the body has a non-circular shape in a cross-sectional plane P oriented perpendicular to a center longitudinal axis A of the body at an axial center of the ridge.

In FIGS. 4 and 5 are shown the provision of four flutes 20 defined by four flanks 22. In this case, four lobes 18 are provided. The flutes 20 and flanks 22 extend in the longitudinal direction of the body 4 and interrupt the circumferential extension of each ridge 14. Each ridge is thus interrupted four times by the flutes. The flutes are provided for supply of a cooling fluid.

The thread forming tool is preferably made of solid carbide, even though high speed steel may be used.

OPERATION

The thread forming tool is introduced into an opening of a diameter larger than that of the tool itself, while turning it about its own axis. A circular movement is performed about the circumference of the opening, while the tool is moved into the opening at a predetermined rate per turn about the circumference of the opening. A thread of a predetermined pitch is formed by plastic deformation of the inner wall of the opening.

Of course, less than four or more than five lobes may be provided, e.g. three or eight. Furthermore, more or less than four flutes may be provided, depending on the number of lobes chosen.

Of course, also the ridge shown in FIG. 1 may be provided with one or more flutes.

The invention claimed is:

1. A thread forming tool comprising an elongated body defining a center longitudinal axis, said body having adjacent a first end, a connector portion and adjacent a second end a thread forming portion, said thread forming portion comprising at least one non-helical annular ridge extending substantially about a circumference of said body, wherein said body has a non-circular shape in a cross-sectional plane oriented perpendicular to said body at an axial center of said at least one annular ridge.

2. A thread forming tool according to claim 1, wherein said non-circular shape includes at least three lobes.

3. A thread forming tool according to claim 2 wherein said at least one annular ridge is oriented perpendicular to the axis.

4. A thread forming tool according to claim 1 wherein said at least one annular ridge is oriented perpendicular to the axis.

5. A thread forming tool according to claim 1 wherein said body includes a plurality of flanks, a flute formed in an outer surface of at least one of said flanks, the flute extending generally along the axis for conducting cooling fluid and intersecting said at least one ridge to render said at least one ridge discontinuous in the circumferential direction.

6. A thread forming tool according to claim 1 wherein said at least one annular ridge comprises a plurality of annular ridges spaced axially apart by annular grooves.

7. A thread forming tool according to claim 1 wherein said body comprises solid carbide.

8. A thread forming tool comprising an elongated body defining a center longitudinal axis, said body having adjacent a first end thereof a connector portion and adjacent a second end thereof a thread forming portion, the thread forming portion comprising at least one non-helical annular ridge extending substantially about a circumference of said body and oriented perpendicular to said axis, wherein said body has a non-circular shape in a cross-sectional plane oriented perpendicular to said body at an axial center of said at least one annular ridge, said non-circular shape including at least three lobes.

9. A method of forming a thread in a workpiece, said method comprising:

A) introducing into an opening of the workpiece a thread forming tool comprising at least one non-helical annular ridge extending substantially about a circumference of said body, wherein said body has a non-circular shape in a cross-sectional plane oriented perpendicular to said body at an axial center of said at least one annular ridge, wherein the opening has a diameter larger than a maximum diameter of said tool;

B) rotating said tool about said axis; and

C) during step B, moving said tool circularly around a circumference of said opening and simultaneously axially into said opening.

* * * * *